United States Patent
Ivanov et al.

(10) Patent No.: US 9,488,275 B2
(45) Date of Patent: Nov. 8, 2016

(54) SLIDING ELEMENT, IN PARTICULAR A PISTON RING, HAVING A COATING

(71) Applicant: FEDERAL-MOGUL BURSCHEID GMBH, Burscheid (DE)

(72) Inventors: Yuriy Ivanov, Bergisch Gladbach (DE); Marcus Kennedy, Dusseldorf (DE); Ralf Lammers, Wermelskirchen (DE); Michael Zinnabold, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 14/762,278

(22) PCT Filed: Jan. 8, 2014

(86) PCT No.: PCT/EP2014/050207
§ 371 (c)(1),
(2) Date: Jul. 21, 2015

(87) PCT Pub. No.: WO2014/111294
PCT Pub. Date: Jul. 24, 2014

(65) Prior Publication Data
US 2015/0362071 A1  Dec. 17, 2015

(30) Foreign Application Priority Data
Jan. 21, 2013  (DE) .................. 10 2013 200 846

(51) Int. Cl.
C23C 28/00  (2006.01)
F16J 9/26  (2006.01)

(52) U.S. Cl.
CPC .................. *F16J 9/26* (2013.01); *C23C 28/32* (2013.01); *C23C 28/341* (2013.01); *C23C 28/343* (2013.01); *C23C 28/347* (2013.01)

(58) Field of Classification Search
USPC .................................. 427/577; 428/336, 408
See application file for complete search history.

(56) References Cited

U.S. PATENT DOCUMENTS

| | | | |
|---|---|---|---|
| 6,228,471 B1 | 5/2001 | Neerinck | |
| 2009/0001669 A1* | 1/2009 | Hoppe | F16J 9/26 277/442 |
| 2011/0268946 A1* | 11/2011 | Fischer | C23C 30/00 428/217 |
| 2012/0248711 A1* | 10/2012 | Iwashita | C23C 14/0605 277/440 |

FOREIGN PATENT DOCUMENTS

| | | |
|---|---|---|
| DE | 102005063123 B3 | 4/2010 |
| DE | 102008042747 A1 | 4/2010 |
| EP | 1829986 B1 | 9/2007 |
| EP | 2 505 685 A1 | 10/2012 |
| JP | 2008 081630 A | 4/2008 |
| WO | WO 2009/106201 A1 | 9/2009 |

\* cited by examiner

*Primary Examiner* — Archene Turner
(74) *Attorney, Agent, or Firm* — Robert L. Stearns; Dickinson Wright, PLLC

(57) ABSTRACT

The invention relates to a sliding element, in particular a piston ring, having at least one running surface. The running surface comprises a coating, which from the inside to the outside has at least one first adhesive layer, a hard hydrogen-free DLC layer, a second adhesive layer, a soft hydrogen-containing, metal and/or metal carbide-containing DLC layer, which is softer than the hard hydrogen-free DLC layer, and a hard hydrogen-containing DLC layer, which is harder than the soft hydrogen-containing, metal and/or metal carbide containing DLC layer.

9 Claims, No Drawings

SLIDING ELEMENT, IN PARTICULAR A PISTON RING, HAVING A COATING

BACKGROUND OF THE INVENTION

1. Technical Field of the Invention

The invention relates to a sliding element, in particular a piston ring.

2. Related Art

Sliding elements, such as, for example, pistons rings, have running surfaces on which they are in sliding contact with a friction partner. The tribological system is complex and is significantly determined, for example, by the material pairing of the friction partner and the environmental conditions such as, for example, pressure, temperature and surrounding media. Precisely with modern engines, particularly high loads occur, for example, on the piston rings. To ensure and prolong the functionality and lifetime of the components, the running surface properties of the sliding elements can be specifically optimized.

Such optimizations often comprise applying more or less complex layer systems by means of, for example, thermal spraying processes, galvanic processes or thin-layer-technology processes. The primary objective of such layers is to protect against wear and focus is first usually on a high degree of hardness of the layers. Diamond-like carbon layers (diamond-like carbon, DLC) have proven to be particularly hard and tenable layers. These may be varied in many ways, for example by changing their C—C bonding character, the different bonding fractions of the carbon and by the presence or absence of hydrogen and metals in their properties. Often adhesive layers are applied under these wear protection layers, which are supposed to ensure a particularly tenable and strong bonding of the highly-loaded wear protection layer with the base material of the sliding element.

However, the exclusive use of very hard DLC layers leads to some technological problems. On the one hand, the surfaces of these layers must be very smooth so that at a higher surface pressure disruptions do not occur on the surface and so that the layer system does not fail. It can furthermore be shown that, for example, the ring wear and liner wear increase significantly with the roughness of the wear protection layers. Thus, it is necessary to smooth the surfaces of the wear protection layers as much as possible prior to use, however this is associated with extensive technical effort and is very cost-intensive. For example, EP 1 829 986 B1 describes a method how such hard carbon-based layers can be processed by means of bristle-shaped or plate-shaped elements. On the other hand, very hard wear protection layers have unfavorable run-in behavior. Owing to its high degree of hardness, the run-in occurs at the expense of the friction partner which in the run-in phase undergoes increased wear, additionally the formation of scoring and/or burn marks can occur.

In view of the run-in behavior, it can be expedient to provide run-in layers which are softer than the wear protection layers on these. The objective of these layers is to generate a type of tribological "balance" in that the run-in layer is stripped at the first contact with the friction partner and in doing so it performs a reciprocal adjustment of the friction partner. Following the run-in phase, the frictional wear slows down and stabilizes and the hard wear protection layer then ensures long-term favorable friction properties and the lifetime durability.

DE 10 2005 063 123 B3 describes a layer system on a sliding element from the inside to the outside consisting of a wear protection layer, an adhesive layer and a run-in layer of the type Me—C:H, in which hard material particles are also contained, for example WC.

A sliding element is evident from DE 10 2008 042 747 A1 having a coating which from the inside to the outside has an adhesive layer, a PVD layer, optionally a carbon-based layer of the type a-C:H:W, a carbon-based layer of the type a-C:H and a further carbon-based layer of the type a-C:H. It is provided that the outer carbon layer is softer than the underlying carbon layer.

SUMMARY OF THE INVENTION

The invention is based on the object of creating a sliding element, in particular a piston ring for combustion engines, with optimal mechanical and tribological properties. More specifically, the object consists of providing such a sliding element, the surface of which has favorable run-in behavior, i.e. shortened run-in times, reduced counter body wear and less fuel and oil consumption during the run-in. Further, an improved processability of the surface of the sliding element is supposed to be achieved.

The sliding element according to the invention, in particular a piston ring, has at least one running surface, the running surface having a coating which from the inside to the outside has at least a first adhesive layer, a hard hydrogen-free DLC layer, a second adhesive layer, a soft hydrogen-containing, metal-containing and/or metal-carbide-containing DLC layer which is softer than the hard hydrogen-free DLC layer, and a hard hydrogen-containing DLC layer which is harder than the soft hydrogen-containing, metal-containing and/or metal-carbide-containing DLC layer.

The inner hard hydrogen-free DLC layer assumes, after the run-in, the wear protection of the sliding element during long-term operation and thus ensures good lifetime durability and functionality of the sliding element. To optimally fulfill this function, a layer of the type ta-C is preferably selected, i.e. a tetrahedral, hydrogen-free, amorphous carbon layer which is characterized by achievable high degrees of hardness.

The soft hydrogen-containing, metal-containing and/or metal-carbide-containing DLC layer is, in particular compared to the DLC layer described above, comparably soft, however it also has favorable friction behavior. This layer can preferably be formed as a tetrahedral, hydrogen-free, amorphous carbon layer (ta-C) or as a hydrogen-containing amorphous carbon layer (a-C:H) or as a metal-containing and hydrogen-containing amorphous carbon layer (Me-DLC). The soft DLC layer acts as a stabilizing intermediate layer between the two hard DLC layers and thereby stabilizes the layer system against the high shearing forces that occur.

The final outer layer of the coating is formed by a hard hydrogen-containing DLC layer. This layer is preferably configured slightly less hard and has a lower wear resistance than the inner hard DLC layer. By this, a lesser surface roughness can be achieved comparably inexpensively by smoothing processes prior to the use of the sliding element, for example in a combustion engine. The layer is thus suitable as a run-in layer with which good run-in behavior is realized, for example of a piston ring with a cylinder running surface, which as a whole involves short run-in times, reduced counter body wear and less fuel and oil consumption as well as blow-by in the run-in phase.

The layer system is further formed by two adhesive layers which produce a good cohesive bond between the inner hard DLC layer and the soft DLC layer such that the coating does not lose its integrity and function during the high loads in the run-in phase. On the other hand, the first adhesive layer serves as a bonding agent for the base material of the running surface and by this forms the basis for the durability and functionality of the coating as a whole.

The selected DLC layer materials allow for good optimization of the layer properties with regard to their individual use in the coating, for example by way of varying the hydrogen content or the type of added metals. As a whole, a layer system results which is characterized by consistently low friction during the entire lifetime of the sliding element.

Preferably, the hard hydrogen-free DLC layer has a hardness of between approximately 1800 and approximately 3500 HV 0.02, the soft hydrogen-containing, metal-containing and/or metal-carbide-containing DLC layer has a hardness of between approximately 800 and approximately 1400 HV 0.002 and the hard hydrogen-containing DLC layer has a hardness of between approximately 1800 and approximately 3100 HV 0.002. The different degrees of hardness are based, as stated above, on the different functions of the individual layers in the coating. The high maximum hardness of the inner hard hydrogen-free DLC layer ensures the lifetime durability. The lower hardness of the soft DLC intermediate layer is advantageous for the mechanical stabilization of the coating, and the slightly reduced maximum hardness of the outer hard hydrogen-containing DLC layer proves to be advantageous for the run-in behavior of the sliding element. Improved run-in behavior causes a tribological stabilization of the friction partners with one another and a better adjustment of the sliding element to the geometry of the running partner. For this, degrees of hardness in the given range of values prove to be particularly favorable.

To ensure the functionality and usability of the coating, it is preferred that a difference in the degree of hardness between the hard DLC layers and the soft DLC layers corresponds to a factor of approximately 1.2 to approximately 4.4. Lesser differences in the degree of hardness would lead to a too homogenous layer system with very similar layer properties and the effect, for example, of the mechanical stabilization or of optimal run-in behavior or of the good lifetime durability would be lost. Greater differences in the hardness, on the other hand, appear to make little sense technologically and would not have any positive additional effects.

The soft hydrogen-containing, metal-containing and/or metal-carbide-containing DLC layer comprises advantageously phases of tungsten and/or tungsten carbide and/or silicon and/or silicon carbide and/or chromium and/or chromium carbide. It has been shown that the elements W, Si and Cr and/or carbides thereof contained in a hydrogen-containing amorphous carbon layer form a layer which constitutes a good compromise between stabilizing properties and friction properties.

Preferably, the first and/or second adhesive layer is/are metal-containing, in particular Cr-containing. The adhesive layers can be generated by low temperature plasma processes, for example by physical vapor deposition.

The coating of the running surface of the sliding element preferably has a total thickness of approximately 5 µm to approximately 50 µm. Layer thicknesses in this range ensure that the run-in layer and the stabilizing layer are sufficiently thick to carry out their functions and that the wear protection layer has sufficient substance to ensure good friction behavior in continuous operation.

The layer thickness ratio between the thickness of the hard hydrogen-free DLC layer including the first adhesive layer and the thickness of the two hydrogen-containing DLC layers including the second adhesive layer is between approximately 1.1 and approximately 12. Thus, a layer structure in preferred in which the DLC layer acting as the run-in layer is always configured to be thinner than the DLC layer acting as the wear protection layer. The layer thickness ratios can be advantageously varied within this range of values and depending on the operating conditions of the sliding element, for example a relatively thick run-in layer or a relatively thin run-in layer can be realized.

The base material of the sliding element can be formed of steel or a cast material. These materials have proven to be particularly advantageous base materials for highly-loaded sliding elements, for example piston rings.

Further, a surface of at least one DLC layer can be mechanically smoothed. A friction surface as smooth as possible contributes to a significant reduction, for example, of the ring wear and liner wear.

EMBODIMENTS OF THE INVENTION

A complex layer system is conceivable as an exemplary embodiment of the present invention, in which a first chromium-containing adhesive layer is first applied to the base material, for example steel or a cast material, of a sliding element. A hard hydrogen-free DLC layer is then applied to this layer, which ensures the lifetime durability of the layer system as a whole. This is followed by a further metal-containing adhesive layer, followed by a comparably soft hydrogen-containing, metal-containing and/or metal-carbide-containing DLC layer which above all absorbs mechanical shearing forces and acts as a stabilizing factor. On the surface, the layer system is completed by a hard hydrogen-containing DLC layer which has a lower maximum hardness than the inner hard DLC layer and serves as a run-in layer of the sliding element.

The invention claimed is:

1. Sliding element, in particular a piston ring, having at least one running surface, wherein the running surface has a coating which from the inside to the outside has at least
   a first adhesive layer,
   a hard hydrogen-free DLC layer,
   a second adhesive layer,
   a soft hydrogen-containing, metal-containing and/or metal-carbide-containing DLC layer which is softer than the hard hydrogen-free DLC layer, and
   a hard hydrogen-containing DLC layer which is harder than the soft hydrogen-containing, metal-containing and/or metal-carbide-containing DLC layer.

2. Sliding element according to claim 1, in which the hard hydrogen-free DLC layer has a hardness of between approximately 1800 and approximately 3500 HV 0.02, the soft hydrogen-containing, metal-containing and/or metal-carbide-containing DLC layer has a hardness of between approximately 800 and approximately 1400 HV 0.002, and the hard hydrogen-containing DLC layer has a hardness of between approximately 1800 and approximately 3100 HV 0.002.

3. Sliding element according to claim 1, in which the difference in hardness between the hard DLC layers and the soft DLC layer corresponds to a factor of approximately 1.2 to approximately 4.4.

4. Sliding element according to claim 1, in which the soft hydrogen-containing, metal-containing and/or metal-carbide-containing DLC layer has phases of tungsten and/or tungsten carbide and/or silicon and/or silicon carbide and/or chromium and/or chromium carbide.

5. Sliding element according to claim 1, in which the first and/or second adhesive layer preferably is/are metal-containing, in particular Cr-containing.

6. Sliding element according to claim 1, in which the coating has a total thickness of approximately 5 μm to approximately 50 μm.

7. Sliding element according to claim 1, in which the layer thickness ratio between the thickness of the hard hydrogen-free DLC layer including the first adhesive layer and the thickness of the hydrogen-containing DLC layer including the second adhesive layer is between approximately 1.1 and approximately 12.

8. Sliding element according to claim 1, in which the base material thereof is steel or a cast material.

9. Sliding element according to claim 1, in which a surface of at least one DLC layer is smoothed.

* * * * *